US011734541B2

(12) United States Patent
Nathani et al.

(10) Patent No.: US 11,734,541 B2
(45) Date of Patent: Aug. 22, 2023

(54) TAMPER DETECTION DEVICE

(71) Applicants: SEPIO PRODUCTS PRIVATE LIMITED, Maharashtra (IN); INDIAN INSTITUTE OF TECHNOLOGY, KANPUR, Uttar Pradesh (IN)

(72) Inventors: Murad Nathani, Maharashtra (IN); Darshan Dhruman Gandhi, Maharashtra (IN); Paul Abner Noronha, Maharashtra (IN); Dattaprasad Narayan Kamat, Maharashtra (IN); Sabine Juliane Tripathi, Kalyanpur (IN); Yashowanta Narayan Mohapatra, Kalyanpur (IN); Biswanath Panda, Midnapore (IN); Akhil Kumar Singh Rathore, Katrauli Patti (IN)

(73) Assignees: SEPIO PRODUCTS PRIVATE LIMITED, Maharashtra (IN); INDIAN INSTITUTE OF TECHNOLOGY, KANPUR, Uttar Pradesh (IN)

( * ) Notice: Subject to any disclaimer, the term of this patent is extended or adjusted under 35 U.S.C. 154(b) by 0 days.

(21) Appl. No.: 17/794,692

(22) PCT Filed: Jan. 25, 2021

(86) PCT No.: PCT/IB2021/050536
§ 371 (c)(1),
(2) Date: Jul. 22, 2022

(87) PCT Pub. No.: WO2021/149020
PCT Pub. Date: Jul. 29, 2021

(65) Prior Publication Data
US 2023/0060950 A1    Mar. 2, 2023

(30) Foreign Application Priority Data
Jan. 23, 2020 (IN) .............................. 202021003050

(51) Int. Cl.
*G06K 19/07*    (2006.01)
*G09F 3/03*    (2006.01)

(52) U.S. Cl.
CPC ........ *G06K 19/0724* (2013.01); *G09F 3/0335* (2013.01)

(58) Field of Classification Search
CPC ............ G06K 19/0724; G06K 19/0723; G09F 3/0335; G09F 3/0329
See application file for complete search history.

(56) References Cited

U.S. PATENT DOCUMENTS 9,030,321 B2    5/2015  Breed
9,495,852 B1 *  11/2016 Colby ................ G08B 13/2405
(Continued)

FOREIGN PATENT DOCUMENTS

WO    WO-2006123983 A1 * 11/2006  ........... B65D 55/026
WO    WO-2014018109 A1 *  1/2014  ......... G06K 19/0723

OTHER PUBLICATIONS

International Search Report and Written Opinion for Application No. PCT/IB2021/050536, dated Apr. 6, 2021.

*Primary Examiner* — Tuyen K Vo
(74) *Attorney, Agent, or Firm* — Marshall, Gerstein & Borun LLP

(57) ABSTRACT

The present disclosure relates to the field of security systems and discloses a tamper detection device. The device (100) comprises at least one transducer (106,110), a power supply unit (114), a logical gate (112), a processing unit (104), and, a tamper tag 102). The transducer (106,110) generates a trigger signal upon detection of a tamper event. The logical gate (112) is operable in an open state or a closed state. The processing unit (104) generates a tamper detection signal for changing the state of the logical gate (112) upon receiving the trigger signal or upon detecting loss of power supply from the power supply unit (114). The change in state of (Continued)

Figure 1:
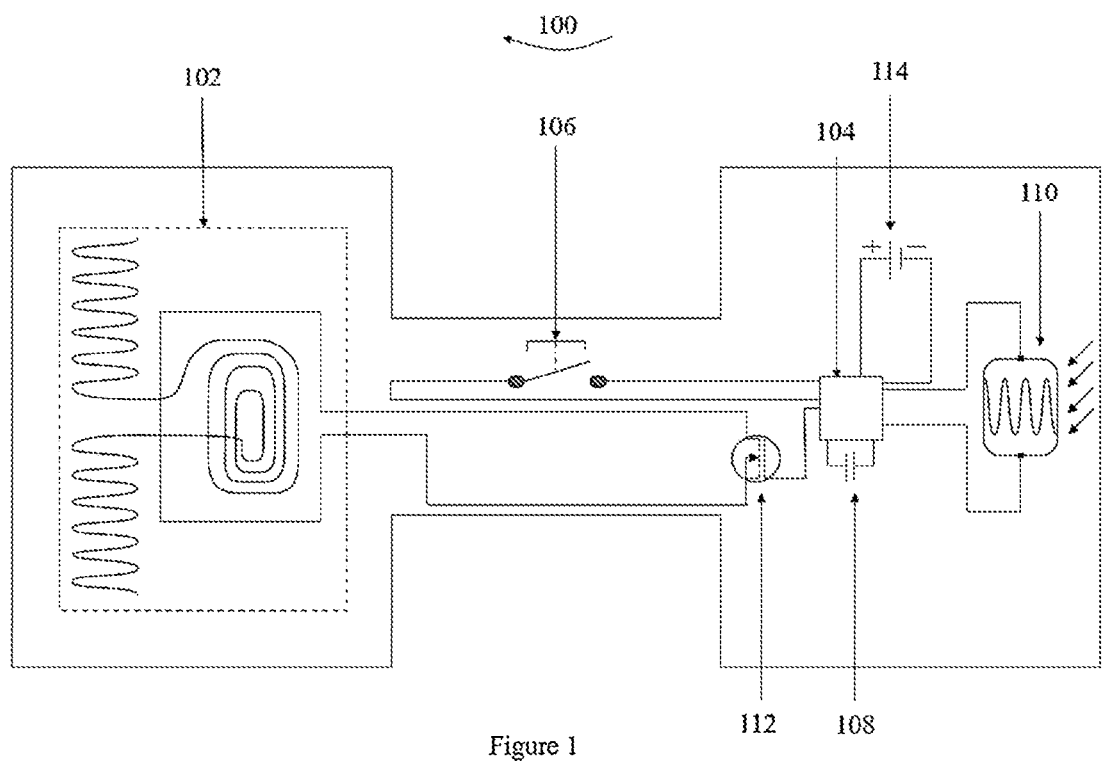

logical gate (112) causes a tamper flag value stored in the tamper tag (102) to change, thereby indicating a tampered status to a reader scanning the tamper tag (102). The device (100) detects a tamper event even if the device (100) is not damaged/broken during tampering.

16 Claims, 2 Drawing Sheets

(56) References Cited

U.S. PATENT DOCUMENTS

| | | |
|---|---|---|
| 2005/0231365 A1 | 10/2005 | Tester et al. |
| 2011/0254665 A1* | 10/2011 | Lindsay ............ G06K 19/07345 340/10.5 |
| 2021/0110229 A1* | 4/2021 | Colby .............. G06K 19/07749 |

* cited by examiner

TAMPER DETECTION DEVICE

FIELD

The present disclosure relates generally to the field of security systems. More particularly, the present disclosure relates to a tamper detection device.

BACKGROUND

The background information herein below relates to the present disclosure but is not necessarily prior art.

Currently available passive and active Radio Frequency Identification (RFID) or Near Field Communication (NFC) based security seals/tags with tamper flags are not capable of detecting a tamper event in real time unless they are polled by an RFID/NFC reader. In the absence of RFID/NFC reader, a skilled counterfeiter can tamper with such a tag/seal and reassemble the same without leaving any electronic trace i.e. without changing the status of the tamper flag. Further, the conventional security systems are not capable of detecting unauthorized intrusions into the containers which are made without touching/damaging the seals, for example, by drilling holes through the containers. Such tampering events are not recorded by the tamper seal. Hence, under such a condition, when the tamper flag is read by an RFID reader, it will show a non-tampered status even though the seal/tag has been tampered with, which is not desired.

There is, therefore, felt a need for developing a tamper detection device that eliminates the above-mentioned drawbacks.

OBJECTS

Some of the objects of the present disclosure, which at least one embodiment herein satisfies, are as follows:

It is an object of the present disclosure to ameliorate one or more problems of the prior art or to at least provide a useful alternative;

An object of the present disclosure is to provide a tamper detection device.

Another object of the present disclosure is to provide a tamper detection device that can detect a tamper event in real time.

Yet another object of the present disclosure is to provide a tamper detection device that can detect a tamper event even if the device is not damaged/broken during tampering.

Still another object of the present disclosure is to provide a tamper detection device that uses a combination of RFID+NFC communication technology to obviate the need for more expensive technology or elaborate solutions involving highpower consumption communication technologies like Bluetooth/BLE, Wi-Fi.

Other objects and advantages of the present disclosure will be more apparent from the following description, which is not intended to limit the scope of the present disclosure.

SUMMARY

The present disclosure envisages a tamper detection device affixed to a container for detecting unauthorized intrusion into the container. The device comprises at least one transducer, a power supply unit, a logical gate, a processing unit, a tamper tag and a capacitor.

The transducer is configured to detect a tamper event, and is further configured to generate a trigger signal upon detection of the tamper event. The transducer is selected from the group consisting of a pressure transducer, a flow meter sensor, a temperature sensor, a piezoelectric transducer, a photoelectric transducer, and a capacitive sensor. The logical gate is operable in an open state or a closed state. In an embodiment, the logical gate is in the open state before use. The logical gate changes to the closed state when the device is fixed to the container and back to the open state when the device is tampered with.

The processing unit is connected to the power supply unit to receive power therefrom. The processing unit is configured to cooperate with the transducer and the logical gate to generate a tamper detection signal for changing the state of the logical gate upon receiving the trigger signal from the transducer or detecting a cut-off of power supply from the power supply unit.

The tamper tag is connected to the logical gate and is configured to store a tamper flag value, wherein a change in the state of the logical gate causes the tamper flag value to change. The tamper flag value indicates a tamper status of the device.

In an exemplary embodiment, the tamper flag value oscillates between '0' and '1' based on the state of the logical gate. The tamper flag value of '0' corresponds to the closed state of the logical gate and indicates a non-tampered status and a tamper flag value of '1' corresponds to the open state of logical gate and indicates a tampered status.

The tamper tag further includes an antenna for transmitting the tamper status to a reader, when the tag is scanned by the reader. The antenna is selected from the group consisting of a Radio Frequency Identification (RFID) antenna, a Near Field Communication (NFC) antenna, and an NFC+RFID antenna.

The capacitor is configured to supply power to the processing unit to facilitate generation of the tamper detection signal in absence of the supply power from the power supply unit.

In an embodiment, the at least one transducer includes a pressure transducer and a photoelectric transducer. One pair of output terminals of the processing unit is connected to the pressure transducer and another pair of output terminals of the processing unit is connected to the photoelectric transducer. The pressure transducer can be selected from the group consisting of a force sensing resistor, a tactile switch, and a strain gauge. The photoelectric transducer can be selected from an LED (Light emitting diode), a light dependent resistor (LDR), a photo diode, and a photo transistor.

In an embodiment, the pressure transducer is fixed on a bridge between a frame and an edge of a door of the container to sense opening of the door and generate the corresponding trigger signal. The photoelectric transducer is fixed on an inner side of the door of the container to sense entry of light thereinto and generate the corresponding trigger signal. The processing unit generates the tamper detection signal when the pressure sensed by the pressure transducer exceeds a pre-defined threshold value, or when the entry of light into the container is sensed by the photoelectric transducer, or when the cut-off of power supply from the power supply unit is detected.

In one embodiment, the power supply unit includes a rechargeable or a non-rechargeable battery. Alternatively, the power supply unit includes an energy harvesting unit selected from at least one of a piezoelectric transducer and a solar cell.

In an embodiment, the processing unit is programmed to generate the tamper detection signal for opening the logical gate after a pre-set delay, upon receiving the trigger signal from the transducer or detecting the cut-off of power supply from the power supply unit.

In an embodiment, the processing unit includes a real-time clock to keep track of a current date and time and a data logger configured to cooperate with the real-time clock to record a detected tampering event, date and time corresponding to the event, and additional information associated with the tampering event.

BRIEF DESCRIPTION OF ACCOMPANYING DRAWING

Figure 2:
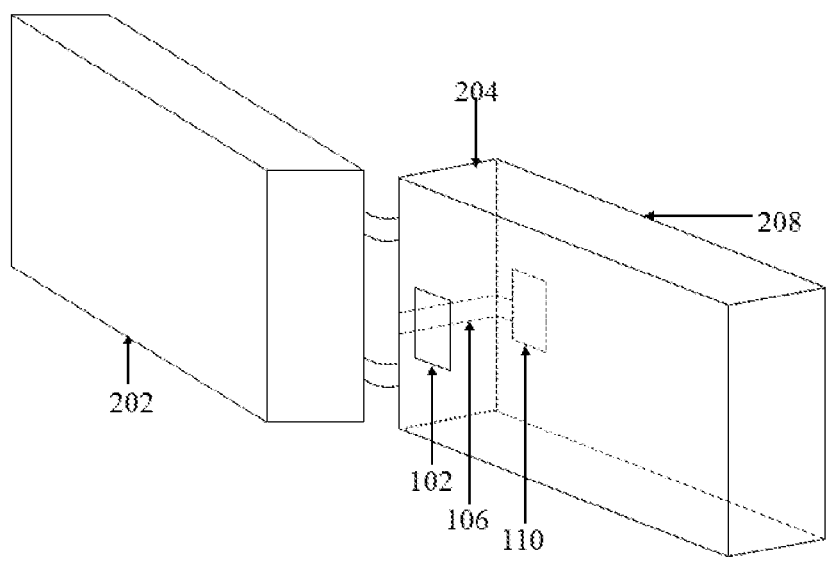

A tamper detection device of the present disclosure will now be described with the help of the accompanying drawing, in which:

FIG. 1 illustrates a block diagram of a tamper detection device, in accordance with the present disclosure; and FIG. 2 illustrates a fixing arrangement of the tamper detection device of FIG. 1 on a container door, in accordance with the present disclosure.

LIST OF REFERENCE NUMERALS USED IN DETAILED DESCRIPTION AND DRAWING

100— Tamper detection device
102—Tamper Tag
104—Processing unit
106— First transducer
108— Capacitor
110— Second transducer
112— Logical Gate (BJT/MOSFET)
114— Battery (Power supply unit)
202— Door frame
204— Edge of the door
206— Container door
208— Inner face of the container door

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details, are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a," "an," and "the" may be intended to include the plural forms as well, unless the context clearly suggests otherwise. The terms "comprises," "comprising," "including," and "having," are open ended transitional phrases and therefore specify the presence of stated features, integers, steps, operations, elements, modules, units and/or components, but do not forbid the presence or addition of one or more other features, integers, steps, operations, elements, components, and/or groups thereof.

When an element is referred to as being "mounted on," "engaged to," "connected to," or "coupled to" another element, it may be directly on, engaged, connected or coupled to the other element. As used herein, the term "and/or" includes any and all combinations of one or more of the associated listed elements.

Existing security seals/tags are not capable of detecting tamper events that are carried out without damaging/breaking the seals. Therefore, a security seal can be skillfully tampered with, without affecting the value of tamper flag within the seal, such that when the tamper flag is read by a reader, it will show a non-tampered status even though the seal/tag has been tampered with. To overcome this problem, a tamper status detecting device (hereinafter referred as "device 100") of the present disclosure is envisaged.

Referring to FIG. 1, the tamper detection device 100 comprises a tamper tag 102, a processing unit 104, a logical gate 112, a power supply unit 114, at least one transducer (106 and 110), and a capacitor 108. The tamper tag 102 includes a memory comprising a tamper flag. The tamper status is reported via the tamper flag. The tag 102 further includes an antenna for transmitting the tamper status to a reader when the tag 102 is scanned by the reader. The antenna may be selected from the group consisting of a Radio Frequency Identification (RFID) antenna, a Near Field Communication (NFC) antenna, and an NFC+RFID antenna. Accordingly, the tamper flag value can be read by an RFID/NFC reader.

The terminals/leads of the tamper tag 102 may be connected to the logical gate 112 that is driven by the processing unit 104. In one embodiment, the processing unit 104 may include the logical gate 112. The logical gate 112 is operable in an open state or a closed state. As the tamper tag 102 is connected to the logical gate 112, the value of the tamper flag may be made dependent on the state of the logical gate.

The transducer is configured to detect tamper events, and generate a trigger signal upon detection of the tamper events. The processing unit 104 is connected to the power supply unit 114 to receive power therefrom. The processing unit 104 is configured to cooperate with the transducer (106, 110) and the logical gate 112 to generate a tamper detection signal for changing the state of the logical gate 112 upon (i) receiving the trigger signal from the transducer (106, 110) or (ii) detecting a cut-off of power supply from the power supply unit 114.

A change in the state of the logical gate 112 causes the tamper flag value to change. The tamper flag value indicates the tamper status of the device 100. In one embodiment, the tamper flag value oscillates between '0' and '1' based on the state of the logical gate 112. The tamper flag value corresponding to an open state of the logical gate may be '1' and the reader can be configured to read the tamper flag value of '1' as "tampered". In an alternate embodiment, the tamper flag value corresponding to an open state of the logical gate may be '0' and the reader can be configured to read the tamper flag value of '0' as "not tampered".

In an exemplary embodiment, the device 100 includes two transducers (106, 110). One pair of output terminals/leads of the processing unit 104 may be connected to the first transducer 106 and another pair of output terminals/leads of the processing unit 104 may be connected to the second transducer 110. The first and second transducers (106, 110) may be configured to detect tamper events, and the processing unit 104 may be further configured to change the state of the logical gate, upon detection of the tamper events. The change in state of logical gate causes corresponding change in the value of tamper flag, which is then read by the reader to detect tampering. The first and second transducers (106, 110) may be selected from the group consisting of a pressure transducer, a flow meter sensor, a temperature sensor, a piezoelectric transducer, a photoelectric transducer, a capacitive sensor and the like.

The device 100 may be used to secure containers, store rooms, storage containers, shipping containers, and the like. The rooms/containers may include one or more doors.

In an embodiment of FIG. 2, the first transducer 106 is a pressure transducer and the second transducer 110 is a photoelectric transducer. The device 100 may be attached to a container door 206 such that the tamper tag 102 is stuck on the outside of the door 206. The first transducer 106 is placed on a bridge located between the door frame 202 and the edge 204 of the door 206. The second transducer 110 is housed within a flag stuck on the inner face 208 of the door 206 such that it is exposed to light only when the door 206 is opened.

The pressure transducer may be selected from the group consisting of, but not limited to force sensing resistor (FSR), tactile switch, strain gauge, and the like. The photoelectric transducer may be selected from the group consisting of, but not limited to LED (Light emitting diode), light dependent resistor (LDR), photo diode, photo transistor, and the like.

In an embodiment, the logical gate 112 is in an open state before use. The tamper flag value corresponding to the open state of the logical gate may be '1' indicating that the seal/tag 102 is "unlocked". When the container is loaded and the container door 206 is closed (i.e. locked) after fixing the device 100, the pressure transducer may experience a pressure. When the pressure experienced by the pressure transducer reaches a pre-defined threshold value, the processing unit 104 closes the logical gate 112. The threshold pressure value for triggering a closing event can be controlled by adding additional electronic components to regulate the output of the pressure transducer or by selecting the pressure transducer accordingly. The tamper flag value corresponding to the closed state of the logical gate may be '0' indicating that the tag/seal 102 is "not-tampered" or "locked". Thus, when a user scans the tamper tag 102 using the reader, the tamper status is shown as "not-tampered".

Once the logical gate 112 is closed, the processing unit 104 may be programmed to open the logical gate 112 after a pre-set delay, only when any one of the following conditions are met:
  i. when the pressure on the pressure transducer changes by a pre-determined value, wherein the pre-determined value can be controlled by adding additional electronic components to regulate the output of the pressure transducer or by selecting the transducer accordingly;
  ii. when a pre-determined amount of light falls on the surface of the photoelectric transducer, wherein the pre-determined amount can be controlled by adding additional electronic components to regulate the output of the photoelectric transducer or by selecting the photoelectric transducer accordingly; and
  iii. when there is any attempt of removal of the power supply unit/battery from the tamper status detecting device 100.

Once the logical gate 112 is opened due to either of the above three conditions, the logical gate 112 cannot be closed again. Thus, when the user scans the tamper tag 102 using the reader, the tamper status is shown as "tampered" or "unlocked".

The pre-set delay of the processing unit 104 ensures that any light falling on the photoelectric transducer before the door 206 is completely closed, does not trigger a false signal to open the logical gate. Once the door 206 is completely secured, the inside of the container should be completely dark.

In an exemplary embodiment, the pressure transducer is placed on the bridge between the frame 202 and the edge 204 of the door 206 and the photoelectric transducer 110 is fixed on the inner side of the door 206. When the door 206 is opened, the bridge of the pressure transducer 106 may be squeezed between the frame 202 and the edge 204 of the door 206. This exerts pressure on the pressure transducer 106. When the pressure experienced by the pressure transducer 106 changes by the pre-determined value, the pressure transducer 106 generates a trigger signal for opening the logical gate 112 to the processing unit 104. This causes the tamper flag value to change from '0' to '1' and the tamper status to change from "not-tampered" to "tampered". Thus, a tamper event caused by opening of the door 206 is detected.

Any attempt to open the door 206 or access the container by drilling a hole through the side of the container will also trigger a tamper event due to light falling on the photoelectric transducer. Similarly, any attempt to open or dislodge the door 206 from the hinges will trigger a tamper event due to change in the pressure experienced by the pressure transducer.

In an embodiment, the capacitor 108 can be used to store energy generated by the first and second transducers (106, 110) in order to power the processing unit 104 temporarily even after the tamper events have occurred. The capacitor 108 can be further used to supply power to the processing unit 104 to facilitate generation of the tamper detection signal in absence of the supply power from the power supply unit 114. In another embodiment, the processing unit 104 can be powered by a battery independent of the transducers (106, 110).

In an embodiment, the tamper tag 102 includes at least one of NFC and RFID antenna to transmit the tamper flag value to the reader. Thus, the device 100 does not need expensive or high power consuming communication methods like Bluetooth/BLE, Wi-Fi and like that.

In another exemplary embodiment, the default condition of the logical gate 112 is open. A first user/an exporter may attach the device 100 to the container door 206. At this stage, the logical gate closes due to the pressure experienced by the pressure transducer. The closed state of the logical gate corresponds to a "not-tampered" or "locked" tamper status. The container may be transported to an end user in this condition. Thus, if the end user reads the tamper flag of the tag 102 using the reader, it will show a "not-tampered" or "locked" status. However, if the container is tampered with or opened during transport, without damaging or breaking the device 100, the tamper flag value will change, either due to (i) a change in pressure on the pressure transducer or (ii) detection of light by the photoelectric transducer or (iii) any attempt to remove the power supply from the system to deactivate the device 100. This change in tamper flag value will be reflected as "tampered" or "unlocked" on the reader, when the tag 102 is scanned by the end user. The device 100 is thus able to detect a tamper event in real time. Once the tamper event is detected, it cannot be undone.

In one embodiment, if a counterfeiter tries to remove the battery from the system, in that way counterfeiter deactivates the tamper detection process, the device 100 records this event also as a tamper event. In this case, the capacitor 108 provides power supply to the processing unit 104 till event is recorded.

In another embodiment the processing unit (Microcontroller) 104 keeps tracks of all tamper event from the activation of the tamper tag 102. This is beneficial in the sense that it would allow approximately locating the place of the event. For that, the device 100 includes a real-time clock to keep track of a current date and time and a data logger configured to cooperate with the real-time clock to record a detected tampering event, date and time corresponding to the event, and additional information associated with the tampering event. The additional information may include location of the tamper event. All tampered event data as well as the current time can be recorded in the EEPROM of the central processing unit.

In an embodiment the tamper tag 102 gives information about tampering when scanned with the NFC/UHF reader. But if the users are interested in knowing the cause of the tampered event, then there are three ways to do so, first one is destructive access to the processing unit 104, second one is communication using serial port from the processing unit 104, and third one is using i2c/spi supported NFC/UHF RFID IC. In the destructive access the processing unit 104 is removed from the device 100 and EEPROM data is read through a dedicated EEPROM reading device for microcontroller. The processing unit 104 also supports the serial communication, so the tampered data can be sent serially to the serial monitor. In a case where user is interesting in knowing tampered data over NFC only/UHF only, in such situation i2c/spi supported NFC/UHF IC can be used. The added benefit to the user is that the user doesn't require any other hardware except RFID reader.

In one embodiment, the power supply unit 114 includes a rechargeable or a non-rechargeable battery. In another embodiment, the power supply unit 114 includes an energy harvesting device like piezoelectric transducer, solar panel etc. In this case, power supply like coin cell battery will not be required in the device 100. To store harvested energy, the capacitor 108 can be used. The capacitor 108 may hold charge for the operation of the tamper status detecting device 100. The reader may be a user device such as a mobile phone, a laptop, a tablet, or a portable or wearable electronic device with scanning and processing capabilities. The user device may be associated with a user having a unique account ID. The account IDs may be pre-assigned to authorized users.

The processing unit 104 may be implemented using one or more microprocessors, microcomputers, micro-controllers, digital signal processors, central processing units, state machines, logic circuitries, and/or any devices that manipulate signals based on operational instructions.

Advantageously, the device 100 may be made using either flexible/printed electronics or hybrid electronics (printed with bonded components) or Printed Circuit Board (PCB). Alternatively, the device 100 may be a hybrid of flexible electronics and PCB to achieve both durability and strength.

TECHNICAL ADVANCES AND ECONOMICAL SIGNIFICANCE

The present disclosure described herein above has several technical advantages including, but not limited to, the realization of a tamper detection device that:
  can detect a tamper event in real time;
  can detect a tamper event even if the device is not damaged/broken during tampering; and
  uses a combination of RFID+NFC communication technology to obviate the need for more expensive technology or elaborate solutions involving high power consumption communication technologies like Bluetooth/BLE, Wi-Fi.

The foregoing description of the specific embodiments so fully reveals the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A tamper detection device (100) affixed to a container for detecting an unauthorized intrusion into the container, said device (100) comprising:
  a. at least one transducer (106, 110) configured to detect a tamper event, and further configured to generate a trigger signal upon detection of the tamper event;
  b. a power supply unit (114);
  c. a logical gate (112) operable in an open state or a closed state;
  d. a processing unit (104) connected to said power supply unit (114) to receive power therefrom, said processing unit (104) configured to cooperate with said transducer (106, 110) and said logical gate (112) to generate a tamper detection signal for changing the state of said logical gate (112) upon:
    i. receiving said trigger signal from said transducer (106, 100); or
    ii. detecting a cut-off of power supply from said power supply unit (114);
  e. a tamper tag (102) connected to said logical gate (112) and configured to store a tamper flag value, wherein a change in the state of said logical gate (112) causes said tamper flag value to change, wherein the tamper flag value indicates a tamper status of the device (100); and f. a capacitor (108) configured to supply power to said processing unit (104) to facilitate generation of said tamper detection signal in absence of the supply power from said power supply unit (114).

2. The device (100) as claimed in claim 1, wherein said tag (102) includes an antenna for transmitting the tamper status to a reader, when said tag (102) is scanned by the reader.

3. The device (100) as claimed in claim 2, wherein said antenna is selected from the group consisting of a Radio Frequency Identification (RFID) antenna, a Near Field Communication (NFC) antenna, and an NFC+RFID antenna.

4. The device (100) as claimed in claim 1, wherein said logical gate (112) is in the open state before use, wherein said logical gate (112) changes to the closed state when said device (100) is fixed to the container and back to the open state when said device (100) is tampered with.

5. The device (100) as claimed in claim 4, wherein said processing unit (104) is programmed to generate said tamper detection signal for opening said logical gate (112) after a pre-set delay, upon:
   a. receiving said trigger signal from said transducer (106, 100); or
   b. detecting the cut-off of power supply from said power supply unit (114).

6. The device (100) as claimed in claim 1, wherein said tamper flag value oscillates between '0' and '1' based on the state of said logical gate (112), wherein a tamper flag value of '0' corresponds to the closed state of said logical gate (112) and indicates a non-tampered status and a tamper flag value of '1' corresponds to the open state of logical gate (112) and indicates a tampered status.

7. The device (100) as claimed in claim 1, wherein said transducer (106, 110) is selected from the group consisting of a pressure transducer, a flow meter sensor, a temperature sensor, a piezoelectric transducer, a photoelectric transducer, and a capacitive sensor.

8. The device (100) as claimed in claim 1, wherein said at least one transducer (106, 110) includes a pressure transducer and a photoelectric transducer.

9. The device (100) as claimed in claim 8, wherein one pair of output terminals of said processing unit (104) is connected to said pressure transducer (106) and another pair of output terminals of said processing unit (104) is connected to said photoelectric transducer (110).

10. The device (100) as claimed in claim 8, wherein said pressure transducer (106) is selected from the group consisting of a force sensing resistor (FSR), a tactile switch, and a strain gauge.

11. The device (100) as claimed in claim 8, wherein said photoelectric transducer (110) is selected from an LED (Light emitting diode), a light dependent resistor (LDR), a photo diode, and a photo transistor.

12. The device (100) as claimed in claim 8, wherein,
   a. said pressure transducer (106) is fixed on a bridge between a frame (202) and an edge (204) of a door (206) of the container to sense opening of the door (206) and generate the corresponding trigger signal; and
   b. said photoelectric transducer (110) is fixed on an inner side of the door (206) of the container to sense entry of light thereinto and generate the corresponding trigger signal.

13. The device (100) as claimed in claim 12, wherein said processing unit (104) is configured to generate said tamper detection signal when:
   a. the pressure sensed by said pressure transducer (106) exceeds a pre-defined threshold value;
   b. the entry of light into the container is sensed by said photoelectric transducer (110); or
   c. the cut-off of power supply from said power supply unit (114) is detected.

14. The device (100) as claimed in claim 1, wherein said power supply unit (114) includes a rechargeable or a non-rechargeable battery.

15. The device (100) as claimed in claim 1, wherein said power supply unit (114) includes an energy harvesting unit, said energy harvesting unit including at least one of a piezoelectric transducer and a solar cell.

16. The device (100) as claimed in claim 1, wherein said processing unit (104) includes:
   a. a real-time clock to keep track of a current date and time; and
   b. a data logger configured to cooperate with said real-time clock to record a detected tampering event, date and time corresponding to said event, and additional information associated with the tampering event.

* * * * *